United States Patent
Kuruvilla et al.

(10) Patent No.: US 10,329,058 B2
(45) Date of Patent: Jun. 25, 2019

(54) METHOD AND APPARATUS FOR FORMING A NOTCHED HINGE CONNECTION IN A THERMOFORMED CONTAINER

(71) Applicant: Tekni-Plex, Inc., Wayne, PA (US)

(72) Inventors: Babu Kuruvilla, Griffin, GA (US); Richard L. Ramirez, Lawrenceville, GA (US); Mark A. Bergeron, Monroe, GA (US)

(73) Assignee: Tekni Plex, Inc., Wayne, PA (US)

( * ) Notice: Subject to any disclaimer, the term of this patent is extended or adjusted under 35 U.S.C. 154(b) by 361 days.

(21) Appl. No.: 15/156,705

(22) Filed: May 17, 2016

(65) Prior Publication Data
US 2016/0257455 A1    Sep. 8, 2016

Related U.S. Application Data

(62) Division of application No. 14/460,889, filed on Aug. 15, 2014, now Pat. No. 9,340,350.

(51) Int. Cl.
| | |
|---|---|
| *B65D 43/16* | (2006.01) |
| *B65D 85/32* | (2006.01) |
| *B29C 51/32* | (2006.01) |
| *B29C 51/08* | (2006.01) |
| *B29C 51/26* | (2006.01) |
| *B29K 25/00* | (2006.01) |
| *B29K 67/00* | (2006.01) |

(Continued)

(52) U.S. Cl.
CPC .......... *B65D 43/162* (2013.01); *B29C 51/082* (2013.01); *B29C 51/265* (2013.01); *B29C 51/32* (2013.01); *B65D 43/16* (2013.01); *B65D 85/32* (2013.01); *B29K 2025/06* (2013.01); *B29K 2067/003* (2013.01); *B29K 2105/04* (2013.01); *B29L 2031/7168* (2013.01)

(58) Field of Classification Search
CPC ...... B65D 43/162; B65D 85/32; B65D 43/16; B29C 51/32; B29C 51/082; B29C 51/265; B29K 2025/06; B29K 2067/003; B29K 2105/04; B29L 2031/7168
See application file for complete search history.

(56) References Cited

U.S. PATENT DOCUMENTS

| | | |
|---|---|---|
| 2,865,548 A | 12/1958 | Stewart |
| 3,145,895 A | 8/1964 | Reifers |

(Continued)

OTHER PUBLICATIONS

U.S. Appl. No. 13/349,360, filed Jan. 12, 2012, Trifold Egg Carton for Jumbo Eggs.

(Continued)

*Primary Examiner* — James Mellott
(74) *Attorney, Agent, or Firm* — Polsinelli PC

(57) ABSTRACT

Method and apparatus for forming a hinge in a thermoformed container, such as an egg carton, and the resulting container. The hinge is formed in the mold, by severing a thermoformed container along the length of a hinge line, with the exception of plurality of spaced connecting membranes that are not severed. The alternating severed portions and connecting membranes are referred to herein as a notched hinge connection. The width, depth, and location of the connecting membranes can be adjusted so the hinge area is strong enough to withstand multiple openings during use.

16 Claims, 15 Drawing Sheets

(51) Int. Cl.
  *B29K 105/04* (2006.01)
  *B29L 31/00* (2006.01)

(56) References Cited

U.S. PATENT DOCUMENTS

| | | | |
|---|---|---|---|
| 3,813,027 A | | 5/1974 | Misdom, Jr. |
| 3,923,948 A | * | 12/1975 | Jackson ................. B29C 51/42 |
| | | | 264/153 |
| 5,300,748 A | | 4/1994 | Colombo |
| 5,631,053 A | * | 5/1997 | Andersen .............. B01F 3/1214 |
| | | | 428/36.4 |
| 5,938,068 A | | 8/1999 | Atkins |
| 6,572,909 B1 | | 6/2003 | Bagwell |
| 2005/0189256 A1 | | 9/2005 | St-Onge |
| 2005/0205570 A1 | | 9/2005 | Ramirez |
| 2006/0060493 A1 | | 3/2006 | Marshall |
| 2011/0120898 A1 | | 5/2011 | Archambault |
| 2013/0183412 A1 | * | 7/2013 | Ramirez ............ B65D 77/0413 |
| | | | 426/119 |

OTHER PUBLICATIONS

U.S. Appl. No. 14/062,415, filed Oct. 24, 2013, Apparatus and Method for Aligning and Holding Egg Cartons.
U.S. Appl. No. 13/219,174, filed Aug. 26, 2011, Standard Footprint Egg Carton for Holding Up to Jumbo Size Eggs.
U.S. Appl. No. 13/219,083, filed Aug. 26, 2011, Egg Carton With Mating Cell and Lid Post Structure.
U.S. Appl. No. 14/460,837, filed Aug. 15, 2014, Tri-Fold Egg Carton.
U.S. Appl. No. 29/499,586, filed Aug. 15, 2014, Lid for an Egg Carton.
U.S. Appl. No. 29/499,594, filed Aug. 15, 2014, Lid for an Egg Carton.
U.S. Appl. No. 29/499,588, filed Aug. 15, 2014, Lid for an Egg Carton.
U.S. Appl. No. 14/460,889, filed Aug. 15, 2014, Method and Apparatus for Forming a Notched Hinge Connection in a Thermoformed Container.
U.S. Appl. No. 29/499,548, filed Aug. 15, 2014, Hinge Assembly for an Egg Carton.

* cited by examiner

METHOD AND APPARATUS FOR FORMING A NOTCHED HINGE CONNECTION IN A THERMOFORMED CONTAINER

FIELD OF THE INVENTION

The present invention relates to thermoformed plastic containers having a hinge connection.

BACKGROUND OF THE INVENTION

Thermoplastic formed containers, made of for example, a clear solid thermoformed sheet of polyester, or a thermoformed sheet of polystyrene foam, are in widespread use in the food industry. The thermoformed sheet is molded (shaped) into different portions or compartments, typically including a lid portion joined to an adjacent base portion by a hinge connection. Ideally, the hinge connection can be easily folded mechanically, while being strong enough to withstand multiple openings. Also it is desirable to provide a process for forming the hinge connection that is quick, minimizes wear and tear on the equipment, and produces a consistent hinge. There is an ongoing need to satisfy these competing requirements.

SUMMARY OF THE INVENTION

A method and apparatus are provided for forming a hinge in a thermoformed container, such as an egg carton, and the resulting container. The hinge is formed in the mold, by severing a thermoformed container along the length of a hinge line, with the exception of plurality of spaced connecting membranes that are not severed. The alternating severed portions and connecting membranes are referred to herein as a notched hinge connection. The width, depth, and location of the connecting membranes can be adjusted so the hinge area is strong enough to withstand multiple openings during use.

In one embodiment, the connecting membranes are formed on an outer side of the hinge, away from the direction of folding, for added strength and as so not to interfere with hinge closing. The membranes extend across a flat planar hinge area on either side of the hinge axis (the hinge line) to straighten the hinge line and hold the thermoformed part generally upright (open and flat) after forming, for example during nesting and de-nesting of a stack of empty containers.

In another embodiment, the connecting membranes lie along the hinge axis, as described further below.

In one embodiment, a method is provided for forming a notched hinge by cutting against a hinge molding surface of a thermoforming mold. The hinge forming surface has a plurality of spaced notches (grooves) for forming the connecting membranes of the thermoformed container. A hinge cutting knife, disposed above a top molding surface of the mold, is then used to cut through and sever the thermoformed container along the hinge line, while not severing through the membranes which reside in the notches (grooves) in the mold surface. By providing the notches in the mold surface, as opposed to providing notches in a cutting knife, wear and degradation of the knife is reduced, thus reducing the need for knife replacement. In addition, allowing the knife to cut the entire hinge length, with the displacement of the thermoformed material in the notched areas lying to the outside of the hinge/fold line, allows for a more consistent hinge that is easily folded mechanically.

In one embodiment, a clamping force is applied to hold a hinge area of the thermoformed container against the top molding surface, the clamped hinge area preferably extending adjacent both opposing sides of the hinge line, while the hinge cutting knife is used to cut and form the notched hinge connection. The clamping action assists in holding the severed material adjacent the hinge line from separating. In one embodiment, a spring loaded clamp is used that pushes material into the notched molding surface (grooves) to form the connecting membranes, while the clamping action holds the adjacent severed edges from separating.

In another embodiment, a notched knife is used to form the notched hinge connection, the notched knife blade being movable into position against a smooth (continuous) surface of the mold. In this example the solid sections of the knife blade (between the notches) sever completely through the plastic material along select portions of the hinge axis, while the notched areas of the knife leave un-severed portions of the material intact along the hinge axis. The resulting intact sections of the hinge may lie at least partially on the inside of the folded hinge.

In accordance with one embodiment of the invention, a method of thermoforming a hinged plastic container is provided comprising:

thermoforming a hinged container from a sheet of thermoformable material in a mold, the mold including a top molding surface having:
a first molding surface for forming a first portion of the container;
a second molding surface for forming a second portion of the container; and
a hinge molding surface between the first and second molding surfaces for forming a flat planar hinge connection area between the first and second portions of the container;

providing a knife positioned above the hinge molding surface, the knife having a cutting blade movable against the hinge molding surface;

clamping the flat planar hinge connection area against the hinge molding surface cutting a notched hinge line in the clamped hinge connection area of the thermoformed container in the mold, the notched hinge line including severed portions separated by connecting membranes joining the adjacent portions of the container.

In one embodiment, the hinge molding surface has a plurality notches, spaced apart along the hinge line, in which the connecting membrane portions are formed.

In one embodiment, the notches comprise grooves in the hinge molding surface disposed at an angle to the hinge axis, wherein the knife severs the areas between the grooves and the membranes in the grooves remain at least partially un-severed.

In one embodiment, the knife partially severs the material in the grooves.

In one embodiment, the clamping comprises holding the flat planar hinge connection area between a clamping surface of a clamp and the hinge molding surface.

In one embodiment, the clamp surface engages and holds the hinge connection area on two opposing sides of the hinge axis.

In one embodiment, the cutting blade is notched, the blade having a plurality of notches spaced apart along the hinge axis for forming the connecting membranes of the thermoformed carton.

In one embodiment, the first molding surface is shaped to form a base portion of the container, and the second molding surface is shaped to form a lid portion of the container.

In one embodiment, the first molding surface comprises a matrix of cells.

In one embodiment, the mold further includes a third molding surface comprising a plurality of cells complimentary to the cells of the first molding surface for forming a cover cell portion of the carton, wherein the hinge molding surface is provided between the first and third molding surfaces.

In one embodiment, the container is a tri-fold egg carton, and the molding surfaces include first, second, and third molding surfaces for forming a lid, cell base, and cell cover portions of the carton respectively, with hinge molding surfaces provided between each of the first and second and between the second and third molding surfaces.

In accordance with one embodiment of the invention, an apparatus is provided for thermoforming a plastic hinged container from a sheet of thermoformable material in a mold, the apparatus comprising:
  a mold including a top molding surface having:
  a first molding surface for forming a first portion of the container;
  a second molding surface for forming a second portion of the container; and
  a hinge molding surface between the first and second molding surfaces for forming a flat planar hinge connection area between the first and second portions of the container;
  a clamp for holding the flat planar hinge connection area against the hinge molding surface;
  a hinge cutting knife positioned above the hinge molding surface, the knife having a cutting blade movable against the hinge molding surface for cutting a notched hinge line in the clamped hinge connection area of the thermoformed container in the mold, the notched hinge line including severed portions separated by connecting membranes joining the adjacent portions of the container.

In one embodiment, the hinge molding surface has a plurality notches, spaced apart along the hinge line, in which the connecting membrane portions are formed.

In one embodiment, the notches comprise grooves in the hinge molding surface disposed at an angle to the hinge axis, wherein the knife severs the areas between the grooves and the membranes in the grooves remain at least partially un-severed.

In one embodiment, the knife is movable to partially sever the connecting membranes.

In one embodiment, the clamp has a clamp surface that engages and holds the hinge connection area on two opposing sides of the hinge axis.

In one embodiment, the cutting blade is notched, including a plurality of notches spaced apart along the hinge axis for forming the connecting membranes of the thermoformed carton along the hinge connection.

In one embodiment, the container is an egg carton, the first molding surface comprising a plurality of cells for forming a first cell portion of the egg carton, the second molding surface forming a lid portion of the carton.

In one embodiment, the second molding surface comprising a plurality of cells complimentary to the cells of the first molding surface for forming a second cell portion of the carton, wherein when the notched hinge connection is closed the first and second portions of the carton form complimentary cell pockets for holding individual eggs.

In one embodiment, the container is a tri-fold egg carton, and the molding surfaces include first, second, and third molding surfaces for forming a lid, cell base, and cell cover portions of the carton respectively with hinge molding surfaces provided between each of the first and second and between the second and third molding surfaces.

In accordance with another embodiment of the invention, an apparatus is provided comprising:
  a notched striker bar, positionable in a thermoforming mold, for forming a hinge area of a thermoformed container;
  the notched striker bar having a hinge molding surface aligned along a hinge axis;
  a plurality of grooves disposed at an oblique angle to the hinge axis, disposed in spaced apart relation along the length of the hinge axis, each groove providing a molding area for forming a recessed groove in the hinge area of the container.

In accordance with another embodiment of the invention, a plastic thermoformed container is provided comprising:
  a lid and a base;
  the lid hingeably connected to an edge of the base for pivoting between open and closed positions, wherein the lid can be closed over the base to form an assembled carton in the closed position;
  the hinge connection between the lid and base comprising:
    abutting planar wall portions of the lid and base having upper planar wall surfaces lying in a common plane while the lid and base are in the open position;
    a severed hinge line aligned along a hinge axis extending between the abutting wall portions;
    a plurality of connecting membranes spaced apart along the axis of the hinge line, the connecting membranes extending from lower surfaces of the abutting wall portions below the severed hinge line for connecting the abutting portions.

In one embodiment, the container is a unitary sheet of thermoformed plastic material.

In one embodiment, the upper planar wall surfaces of portions are in mating planar engagement when the lid and base are in the closed position.

In one embodiment, the container is an egg carton.

In one embodiment, the base includes a matrix of cells for holding individual eggs.

In one embodiment, the egg carton is a tri-fold egg carton including a cell cover connected to the cell base with the hinge connection, the cell cover including a complimentary matrix of cells to the cell base.

In accordance with another embodiment of the invention, a method of forming a tri-fold plastic thermoformed egg carton is provided comprising:
  providing a unitary sheet of plastic material suitable for thermoforming;
  thermoforming the sheet to form a cell base, a cell cover and a lid, the thermoformed sheet including a hinge connection between adjoining edges of the cell base and the cell cover for pivoting of the cover and base between open and closed positions, the base and cover each having a complimentary matrix of cells that together form a matrix of cell pockets for holding individual eggs when the cover is in the closed position over the base, the lid and base having a hinge connection between opposing edges for pivoting between open and closed positions, wherein when the cover and base are in the closed position the lid can be closed over the cover to form an assembled carton;

the hinge connection between the cell base and cell cover including a common planar wall portion having an upper planar surface lying in a common plane CP, a plurality of thermoformed connecting membranes recessed from the CP and spaced apart along a hinge axis of the hinge connection;

forming a severed hinge line severing the common planar wall portion without severing the connecting membranes, such that the connecting membranes form a hinged connection between the severed portions of the common planar wall portions.

In one embodiment, the hinge connection is formed by thermoforming the sheet against a notched striker bar, the notched striker bar having a planar wall with a plurality of spaced apart grooves, wherein the connecting membranes are formed by deforming the sheet into the grooves of the notched striker bar to form the connecting membranes, and a continuous cutting blade engages the un-notched portions of the sheet formed against the planar wall of the striker bar to form the severed hinge line.

These and other features of the invention will be better understood through a study of the following detailed description and accompanying drawings.

DETAILED DESCRIPTION OF THE INVENTION

Tri-Fold Egg Carton Overview

Referring generally to the figures, a tri-fold egg carton 10 is shown that is formed with two notched hinge connections to illustrate one embodiment of the invention. The carton is formed to accommodate 12 eggs in a 2×6 matrix of cell pockets. The teachings of this disclosure may be equally applied to forming different sizes and types of egg cartons, e.g., for holding 4, 6, 8, 18, or 2 dozen eggs, to a two-part egg carton having a single notched hinge connection between a cell base and lid (no cell cover), as well as being applied to form a variety of different thermoformed plastic containers having a notched hinge connection, such as restaurant food carry-outs, retail store packaging (donuts, etc.), fruit carrying containers, as well as hardware and any other packaging needs. The range of products may include, for example, from one to eight notched hinge connections, such as in a box configuration package. In one embodiment, the container has a tear off lid (cut or torn along the notched hinge line); this may be useful in space saving applications, for example, tearing off the lid, and placing the base in the lid (for eating or table space saving purposes).

Figure 1:
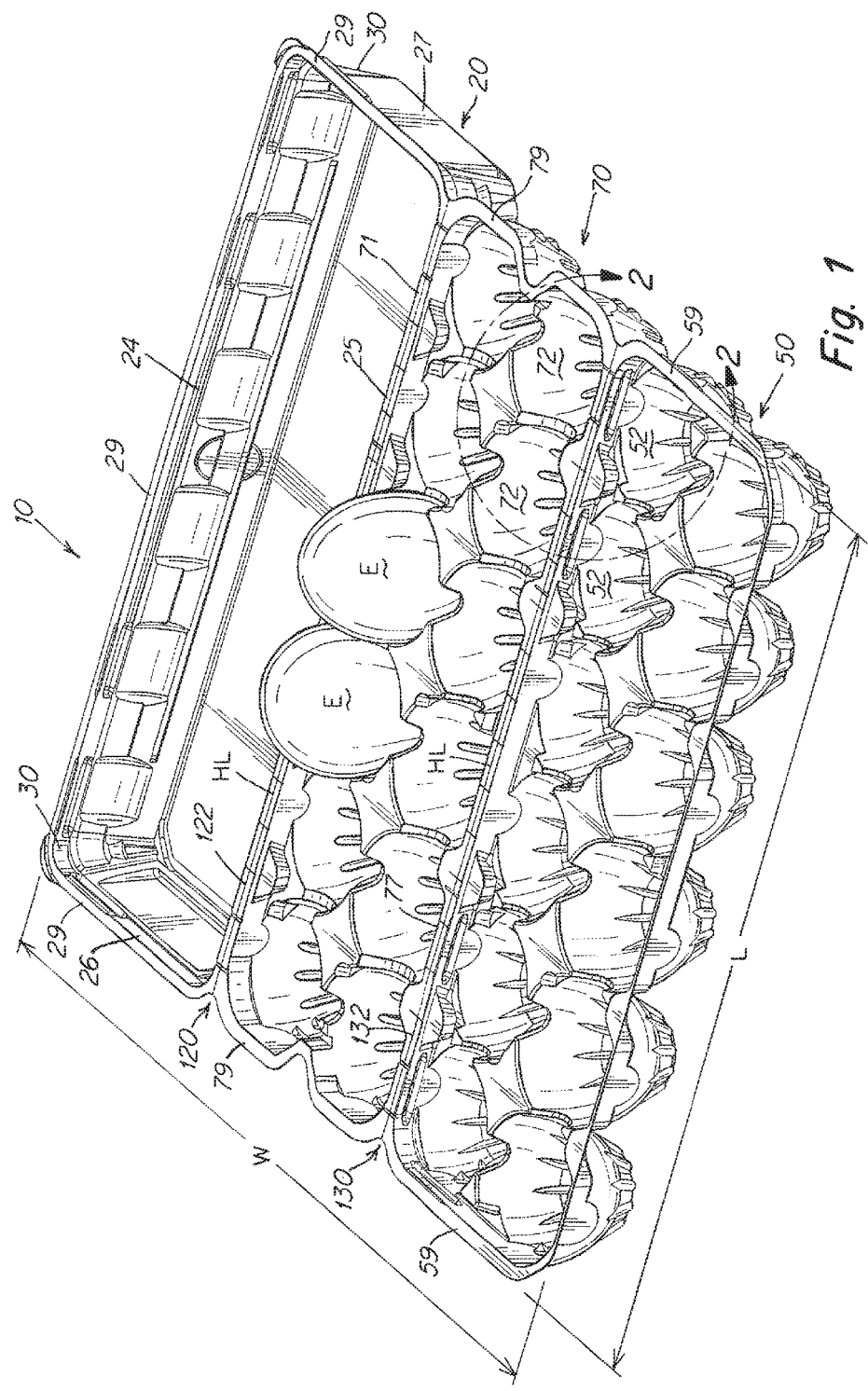
FIG. 1 is a top perspective view of an open tri-fold egg carton having two notched hinge connections formed in accordance with one embodiment of the invention.

In the present embodiment, the tri-fold thermoformed egg carton 10 is formed with a lid 20, a cover 50, and a base 70, wherein a notched hinge connection is formed between each of the lid and base, and between the cover and base. The base and cover each have a complimentary 2×6 array of 12 cells which together, when the cover is closed over the base (FIG. 1A), form a 2×6 array of 12 cell pockets, each cell pocket holding an individual egg E. The cell pockets can hold various size eggs; in the present embodiment each cell pocket will accommodate a jumbo sized egg in either an oriented or un-oriented position. The lid 50 is then closed over the assembled cover 50 and base 70 to form the fully closed container as shown in FIG. 1C.

Figure 1A:
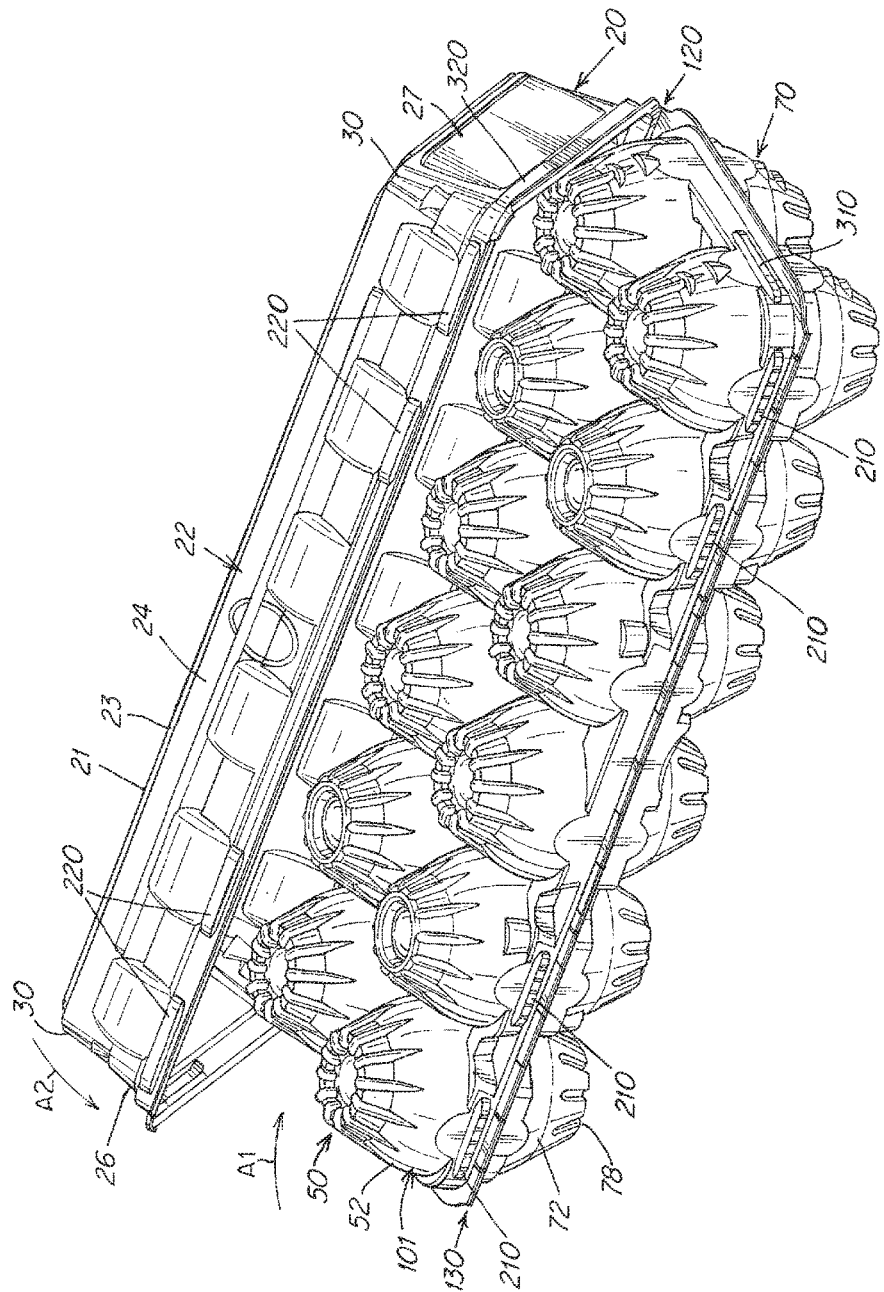
FIGS. 1A-1E show other views of the tri-fold egg carton in partially closed or fully closed positions.
Figure 1B:
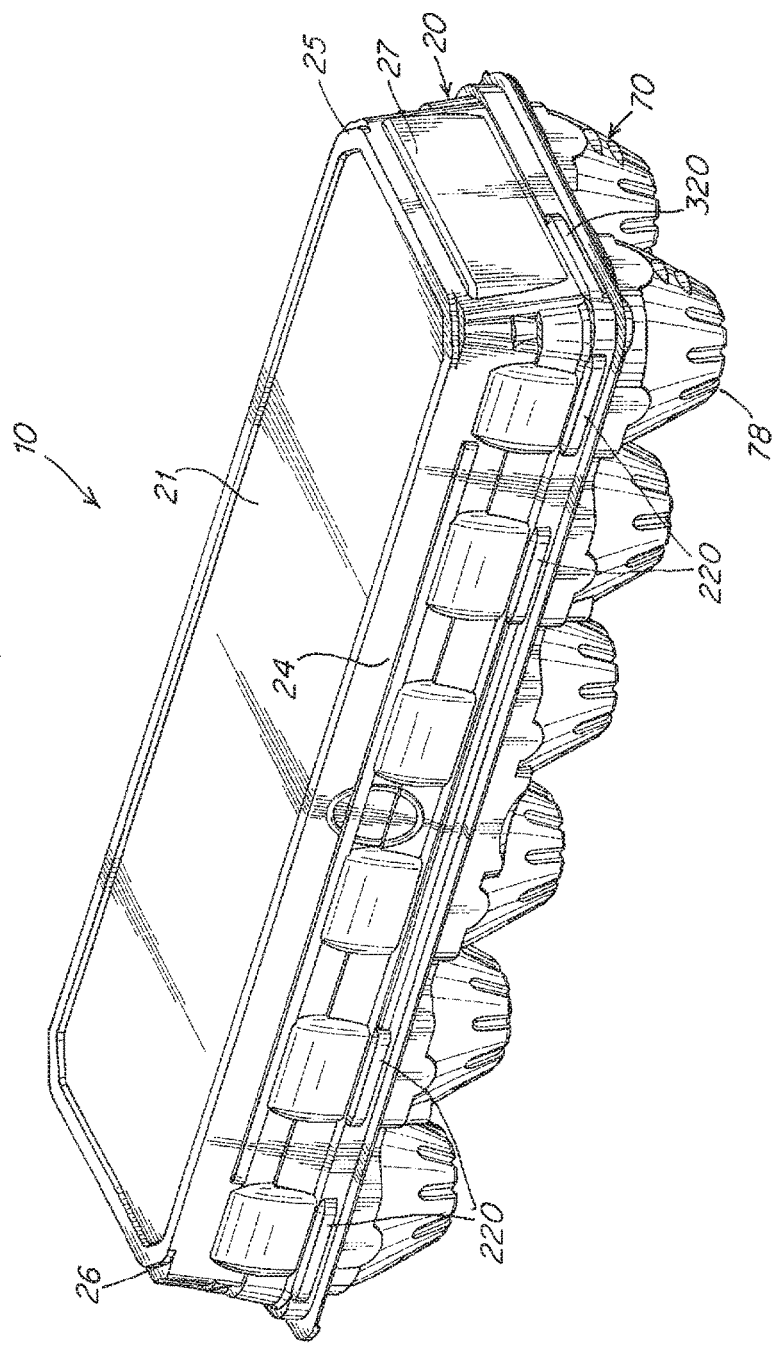
Figure 1C:
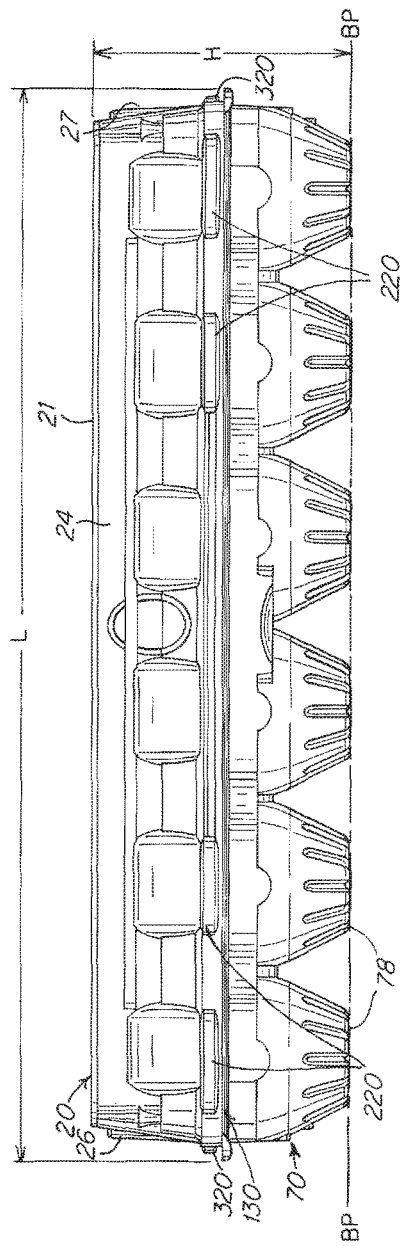

The lid 20 and the base 70 are connected along one elongated edge of the base, in the length L direction, by an elongated hinge area 120 including a notched hinged connection 122 which allows for relative rotation therebetween, whereby the lid is capable of rotating from an open position as shown in FIG. 1A, to a closed position, as shown in FIG. 1B. The carton further includes an elongated hinge area 130 and notched hinge connection 132 along the opposing edge of the base, between the base 70 and cover 50, which allows for relative rotation of the cover over the base. The closed carton (FIGS. 1A-1C) has a length L, a width W, and a height H, and rests on a base plane BP.

The entire egg carton is unitarily molded from a sheet of thermoformable plastic material, wherein the lid 20, the base 70, the cover 50, and the hinge areas 120, 130 are all formed from a single sheet of (e.g., thin gauge) thermoformable plastic material. In one example, the material is a clear solid sheet, such as a polyester, e.g., polyethylene terephthalate. In another example, the thermoformable is polystyrene foam.

Figure 1D:
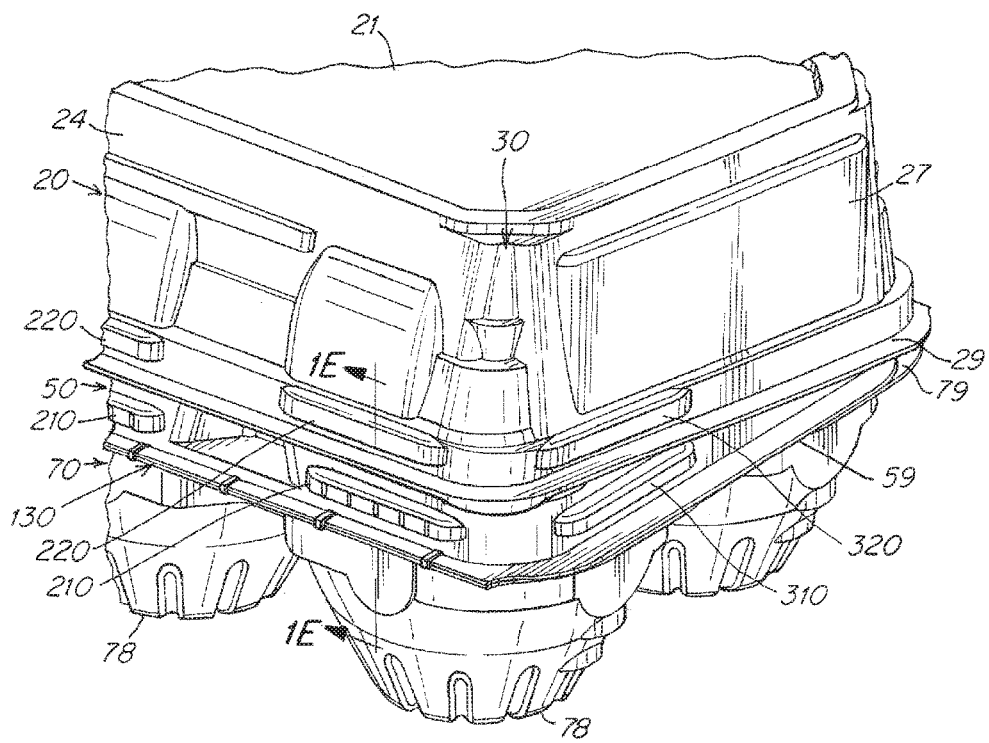
Figure 1E:
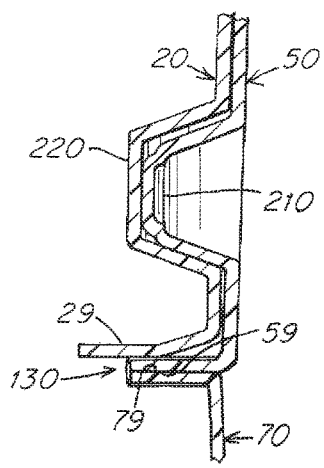

Various features of the lid 20 are shown in FIGS. 1-1E. The lid is formed to include a generally flat planar top wall 21 and a depending sidewall 22, the sidewall 22 extending from the perimeter 23 of the top wall 21 toward a base plane BP on which the closed carton rests (FIG. 1C). The lid sidewall generally defines a rectangular shape including opposing elongated (in the L direction) front and rear sidewalls 24, 25 and opposing end walls 26, 27 (in the W direction) joined by four rounded corners 30.

Figure 4:
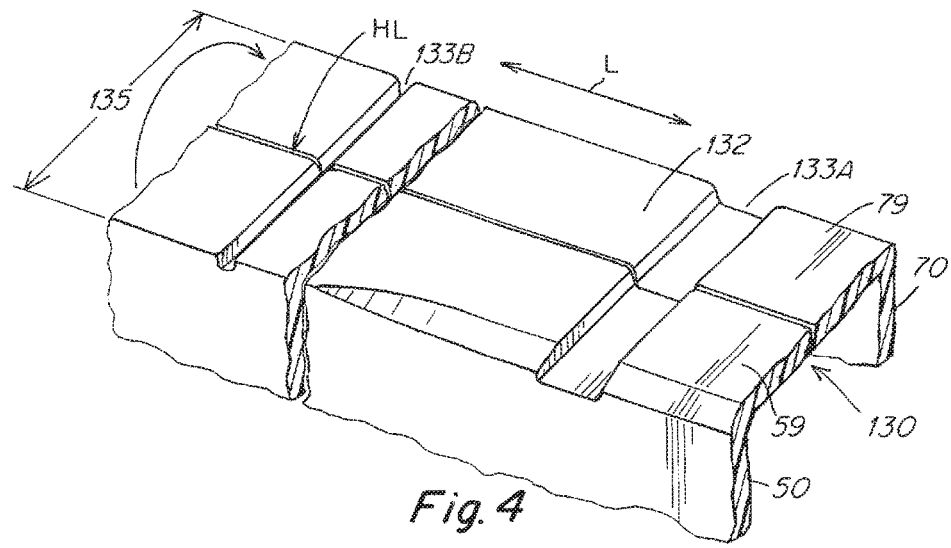
FIG. 4 is a schematic top (interior) fragmentary view of a portion of the hinge area of the carton shown in FIG. 2.

The lid has a generally flat peripheral surface 29 extending around its entire perimeter (also referred to as a trim edge), the flat peripheral surface lying generally in a plane parallel to the base plane BP on which the lowermost base portions 78 (or feet) of the base cells rest (FIG. 4). The base and cover also have generally flat peripheral mating surfaces 79, 59 extending around their perimeters. These peripheral surfaces form supporting surfaces, which engage in planar relation, to strengthen the carton against compressive forces applied in the height H direction. More specifically, when the carton is closed, the base and cover flat peripheral mating surfaces 79, 59 engage, and the flat peripheral mating surface 29 of the lid then rests on the opposite side of the flat peripheral surface 59 of the cover (see FIGS. 1D-1E). These overlapping peripheral surfaces 29, 59, 79 of the lid, cover and base thus absorb much of the compressive forces applied to the closed carton, such as when multiple cartons are stacked in a display case, in a shipping case, and other instances when multiple cases or containers (e.g., each holding a stack of cartons) are stacked one on top of the other.

Returning to the top perspective view of FIG. 1 of a fully open carton, the cell structure will be further described. The twelve cells 72 of the 2×6 cell matrix in the base 70 are each generally cup shaped and formed as either a corner cell 72C or an interior cell 72I. The twelve cells 52 of the cover 50 are similarly shaped and arranged, such that in the assembled state the aligned cell pairs of the cover and base form cell pockets 101 for holding 12 eggs, each in an individual cell pocket. The egg carton 10 has a 2×6 matrix of cell pockets (2 rows of 6 cells per row), with two end cells (52C, 72C) adjacent each end of the carton, and six cells in a row aligned along the front sidewall or rear sidewall respectively.

The carton lid 20 has a plurality of front 220 and side 320 latches, that engage with complimentary front 210 and side 310 latches on the outer surface of the cover 50, when the cover is closed over the base (FIG. 1A), and the lid is closed over the assembled cover and base (FIG. 1B-1C), such that the assembled carton is held securely in the closed position.

As is readily apparent, numerous modifications and changes may readily occur to those skilled in the art. Hence, it is not desired to limit the invention to the exact construction and operation of the container shown and described.

Notched Hinge Connection

FIGS. 2-6 illustrate in greater detail a notched hinge connection formed in an egg carton according to a first embodiment of the invention. In this embodiment, the hinge connection is formed utilizing a notched molding surface in the mold and un-notched cutting blade, as shown in FIGS. 7-12. In an alternative second embodiment, a notched hinge connection as shown in FIGS. 13A-14A, is formed in a mold utilizing a notched cutting knife and un-notched molding surface as shown in FIGS. 9A-10A and 11A-12A.

In the first embodiment (FIGS. 2-6), the hinge area 130 includes a plurality of spaced apart connecting membranes or tabs that extend outwardly, toward the bottom (exterior) surface of the molded carton that is in contact with a top molding surface 402 of the mold 400. These membranes 133 are formed in notched areas 404 (grooves) formed in the molding surface 402 at spaced apart locations in the hinge forming area 406 of the molding surface, each notch extending generally transverse to an elongated hinge axis HA that forms the hinge line HL of the thermoformed carton. Thus, in the egg carton shown in FIGS. 2-6 (and in FIGS. 1-1E), a first hinge line HL lies parallel to the length L direction of the carton 10, aligned with an elongated edge 71 that joins the lid 20 and base 70 portions of the thermoformed carton. A second hinge line HL joins the opposing elongated edge 77 of the base, joining the base 70 and cover 50 portions of the thermoformed carton. The membranes 133 extending from the bottom (exterior) surface of the respective hinge area of the thermoformed carton, lie generally transverse to the hinge axis HA, and generally parallel to the width W direction of the carton. In the embodiment shown in FIGS. 1-6, the hinge line HL is severed the entire length L of the carton, except for the membranes 133. In alternative embodiments, other portions of the hinge line HL may remain un-severed. Also, in this first embodiment, the membranes are regularly spaced along the hinge axis, and they extend the full width of the hinge area 130. In alternative embodiments, the spacing, dimensions, and width extent of the hinge areas may vary.

Figure 5:
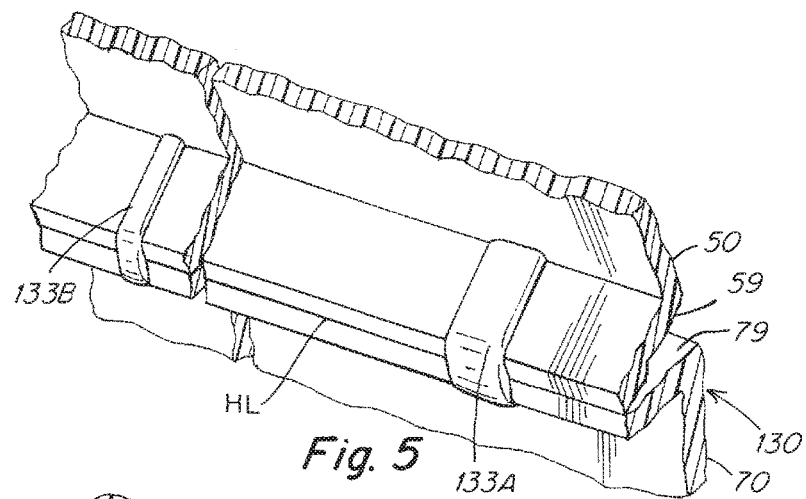
FIG. 5 is a fragmentary view similar to FIG. 4 but showing a portion of the hinge area in the process of being closed (folded)
Figure 6:
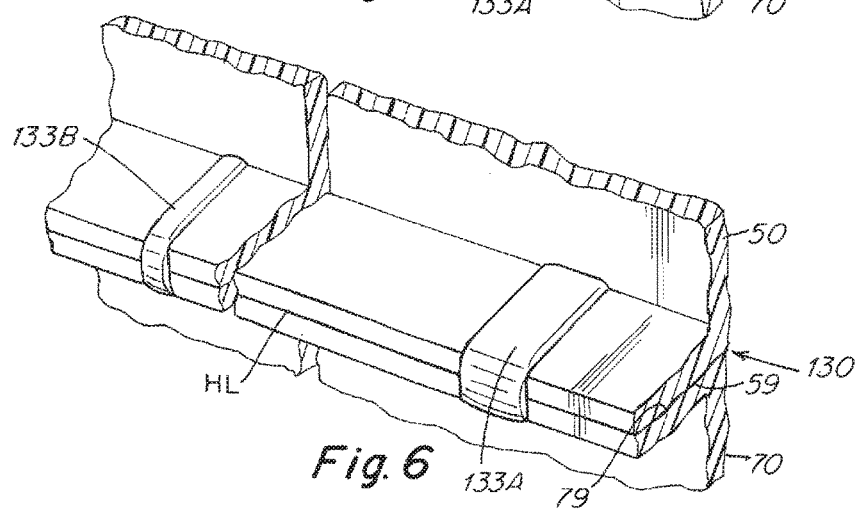
FIG. 6 is a fragmentary view similar to FIG. 5 but showing the hinge area fully closed.

FIGS. 4-6 illustrate one embodiment in which membranes 133A, 133B of different dimensions are formed in the carton. Both membranes extend across the full width 135 of the hinge area 130, but the membrane 133A shown on the right is substantially wider (along the L direction) than the membrane 133B shown on the left.

Figure 2:
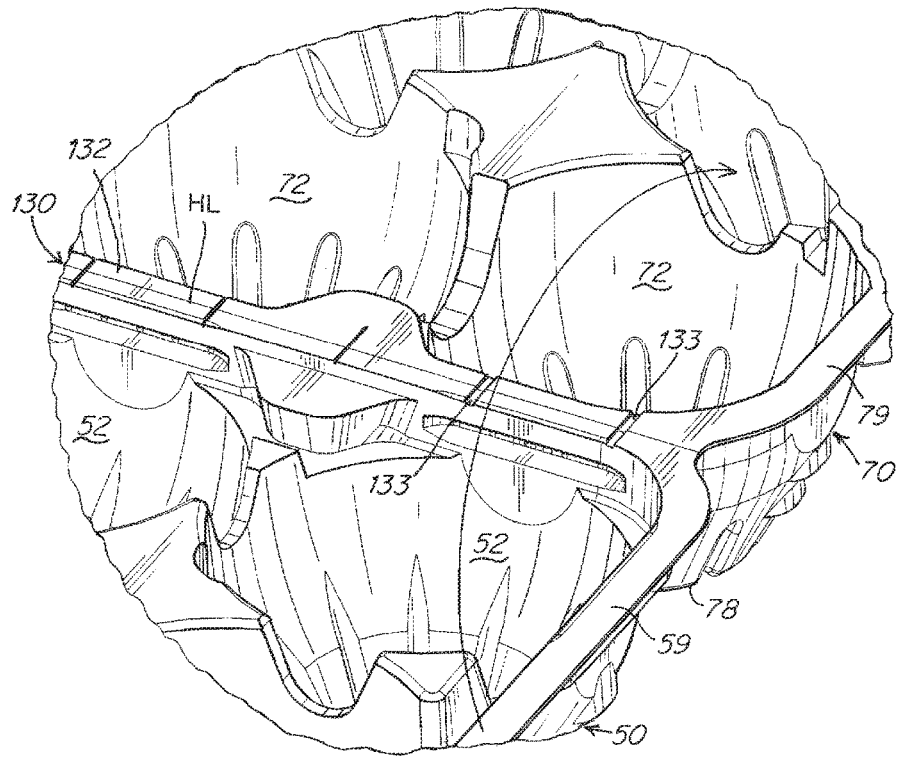
FIG. 2 is an enlarged fragmentary view of the area of the carton encircled by arrows 2-2 in FIG. 1, showing a portion of a hinge area connecting a cell cover and cell base.
Figure 3:
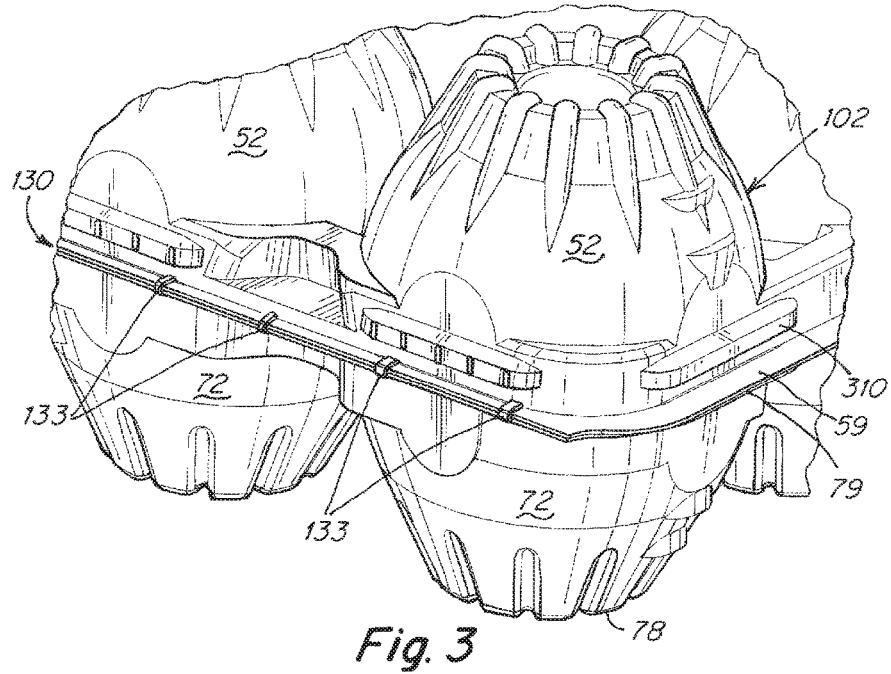
FIG. 3 is an enlarged fragmentary view similar to FIG. 2 but showing the cell cover closed over the cell base along the hinge line.

FIG. 4 is a fragmentary view showing a portion of the hinge area as shown in FIG. 2, where the hinge area is fully open. FIG. 5 is a fragmentary view similar to FIG. 4 but showing the cover 50 being closed over the base 70 (direction of arrow in FIG. 2) and now showing the bottom (exterior) surface of the hinge area 130 with the extending membranes 133. FIG. 6 is a fragmentary view similar to FIG. 5, but showing the cover 50 fully closed over the base 70 and thus the hinge connection 132 fully folded, wherein the mating peripheral surfaces 59, 79 of the cover and base respectively are engaged, while the connecting membranes extend from the bottom (exterior) surface of the carton.

Figure 7:
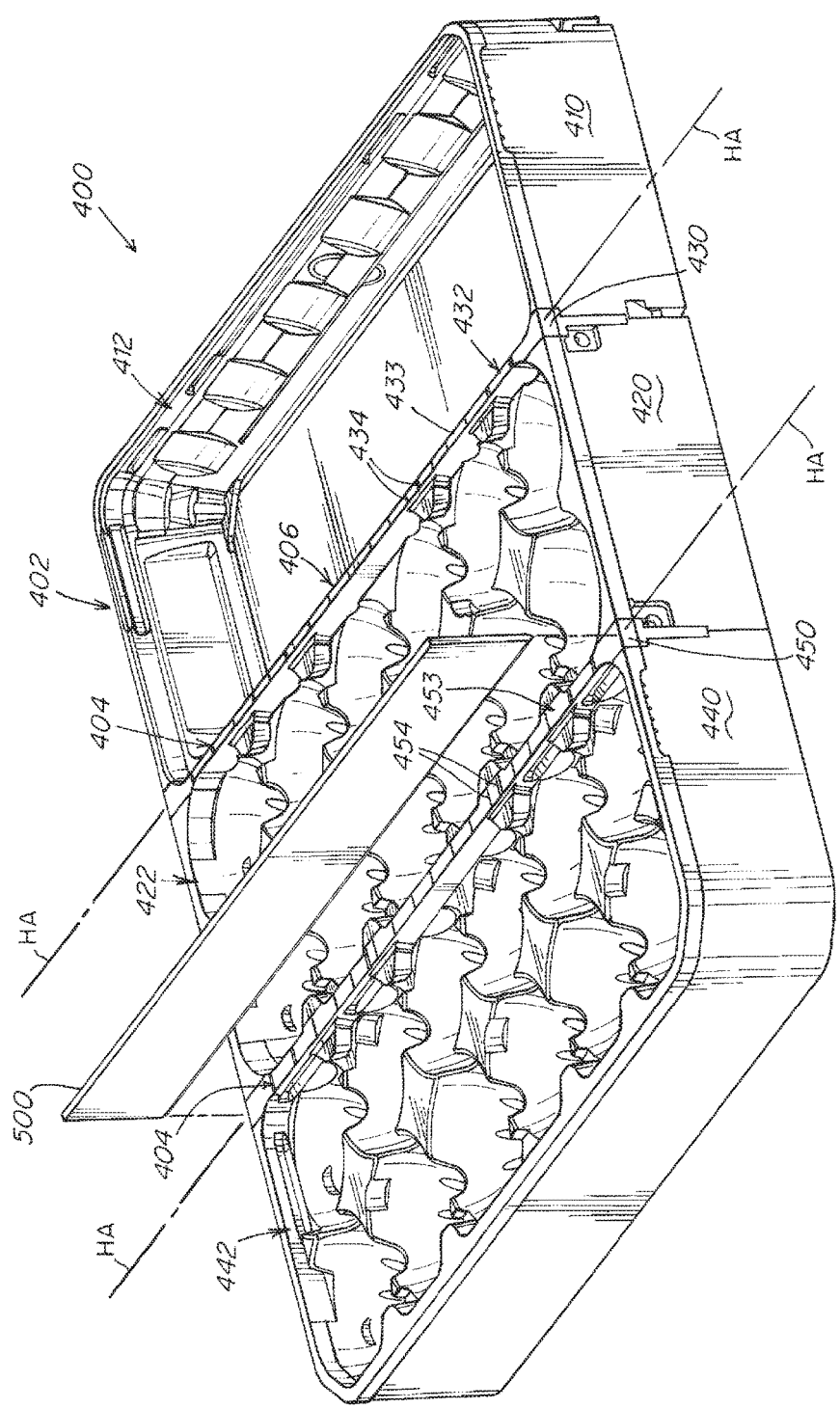
FIG. 7 is an exploded perspective view of a bottom mold half for forming the carton of FIG. 1 according to a first embodiment of the invention, showing a top molding surface having a notched hinge area in the mold, and a continuous cutting blade positioned above the notched area of the mold.

FIGS. 7-10 illustrate one embodiment of an apparatus for forming the hinged connection illustrated in FIGS. 1-6. FIG. 7 is a top perspective view of the bottom mold half 400 of a thermoforming mold, in which the top molding surface 402 of the mold is shaped to form the lid, base, and cover portions respectively of the carton of FIG. 1. Thus a first mold portion 410 has a top molding surface 412 for forming the lid, and an adjacent second mold portion 420 has a top molding surface 422 for forming the base. Between the first and second mold portions is a hinge forming mold portion 430, referred to as a striker bar that provides a molding surface 432 for forming the hinge area 120 between the lid 20 and base 70 of the carton. In accordance with a first embodiment, this striker bar 430 has a smooth uppermost molding surface 433 and a plurality of transverse notches 434 extending down into the striker bar below the uppermost surface 433. The top molding surface of the striker bar may be made of a harder material than the other mold surfaces 410, 420, so as to better withstand engagement by the hinge cutting knife and thus reduce the wear on this molding surface. Also, by providing this striker bar as a separate modular component of the mold, the specific configuration of the hinge area may be modified by replacing the striker bar in the mold with another striker bar having a different notch configuration.

The mold 400 has a third mold section 440, adjacent the second mold section 420, and a second striker bar 450 for forming the hinge area 130 between the cover (formed by the top molding surface 442 of the third mold portion 440), and the base (formed by the top molding surface 422 of the second mold portion 420).

A hinge cutting knife 500 is shown disposed above and spaced apart from the top surface 402 of the mold, aligned along the hinge axis of the second striker bar 450. In accordance with the present embodiment, the blade has a continuous cutting surface that will sever the entire hinge line HL across the length of the hinge area 130 of the carton, leaving only the membranes 133 that extend below the uppermost surface 453 of the striker bar, into the notches 454 formed in the striker bar. The blade is movable in a plane substantially transverse to the top molding surface 402, while the elongated blade axis is aligned with the hinge axis HA. A similar cutting knife may be positioned with respect to the first striker bar 430 for forming the hinge line HL in the hinge area 120 between the lid and base of the carton.

Figure 8:
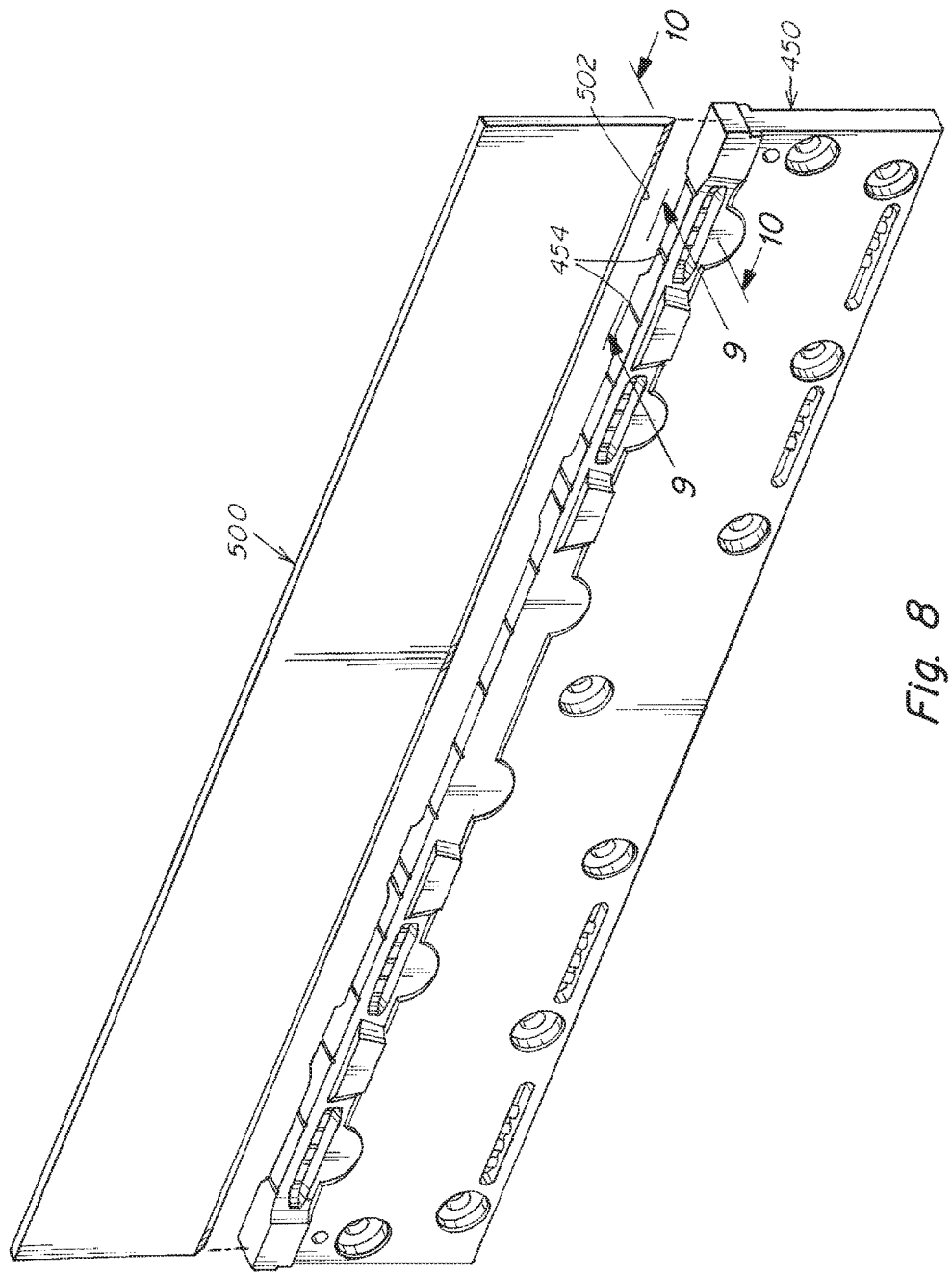
FIG. 8 is an exploded perspective view of the knife and hinge area of the mold of FIG. 7 (with the remaining portions of the mold removed)

FIG. 8 is an exploded perspective view of the knife 500 and striker bar 450 by themselves, separated from the remainder of the mold 400. The knife has a chiseled or pointed cutting edge 502, for engaging the thermoformed carton along the hinge axis HA, and the notched striker bar 450 has a plurality of spaced notches 454 along the length of the striker bar.

Figure 9:
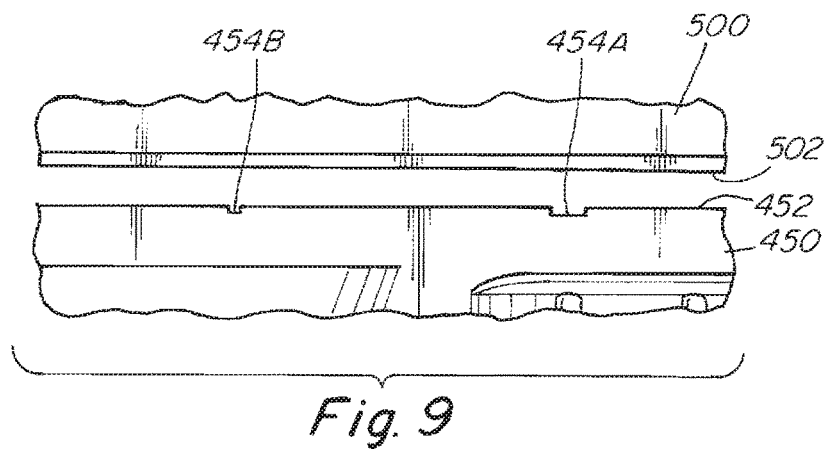
FIG. 9 is an enlarged fragmentary side view of the hinge cutting knife and hinge area of the mold as seen along line 9-9 of FIG. 8.

FIG. 9 is a fragmentary side view of the knife 500 and striker bar 450 as seen along line 9-9 of FIG. 8. FIG. 9 shows in cross-section two notches 454A, 454B in the striker bar 450, having different widths, for forming membranes 133A and 133B respectively.

Figure 10:
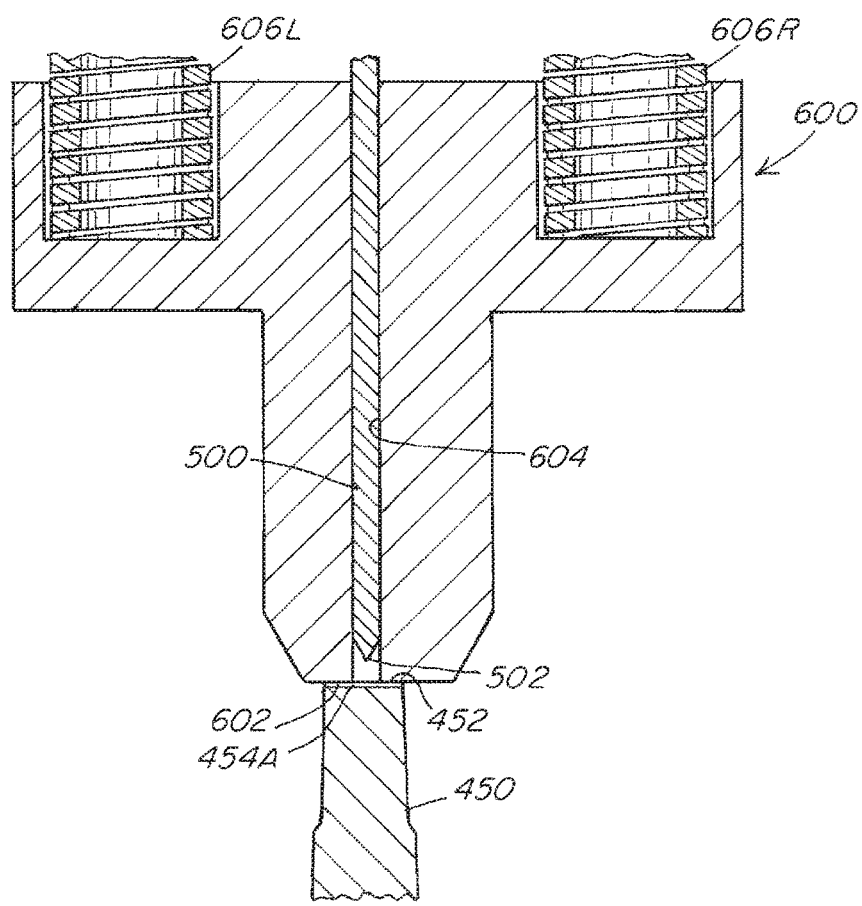
FIG. 10 is an enlarged fragmentary cross-sectional view of the continuous knife blade and notched mold area (first embodiment) taken along line 10-10 of FIG. 8, showing a spring loaded clamp for holding the hinge area of the thermoformed carton during cutting of the hinge line.

FIG. 10 is a fragmentary cross-sectional view of the knife 500 and striker bar 450 taken along line 10-10 of FIG. 8. In addition, FIG. 10 shows a further aspect of the invention wherein a spring loaded clamp 600 holds the hinge area 130 of the thermoformed carton 10 during cutting of the hinge connection 132. In the illustrated embodiment, the clamp 600 has a flat planar engaging surface 602 that is positionable parallel to the top molding surface 452 of the striker bar, while holding the hinge area 130 of the thermoformed carton 10 between the clamping surface 602 and top surface 452 of the striker bar. The clamp has a vertical channel 604 positioned transverse to the top surface 452 of the striker bar through which the cutting blade 500 is moveable, such that with the lowermost clamping surface 602 holding the hinge area 130 against the striker bar 450, the cutting blade 500 can be moved down through the channel 604 aligned along the hinge axis HA for cutting the hinge line HL in the carton. The clamp includes left and right springs 606L, 606R that are connected to an actuating mechanism (not shown), for providing a desired clamping force of the clamping surface 602 against the striker bar 450, while holding the hinge area 130 of the carton therebetween.

Figure 11:
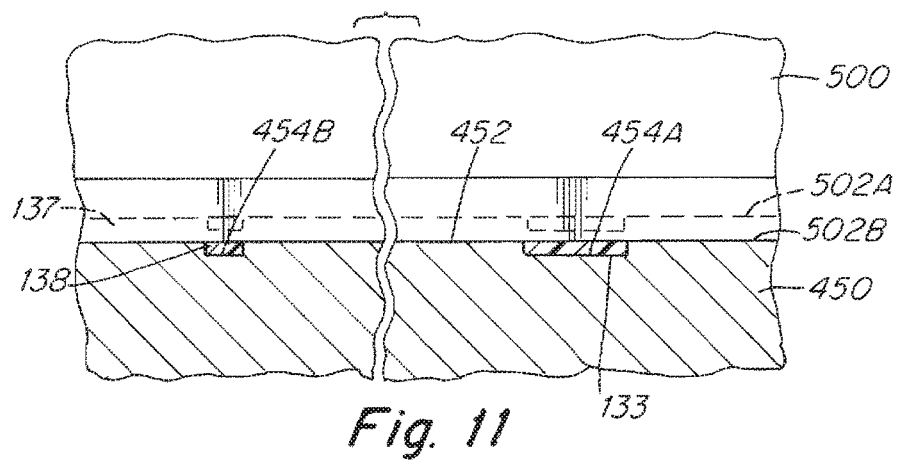
FIG. 11 is a schematic fragmentary enlarged detailed view of the un-notched knife and notched mold surface (first embodiment) as shown in FIG. 9, showing the hinge line of the carton being cut by the knife.
Figure 12:
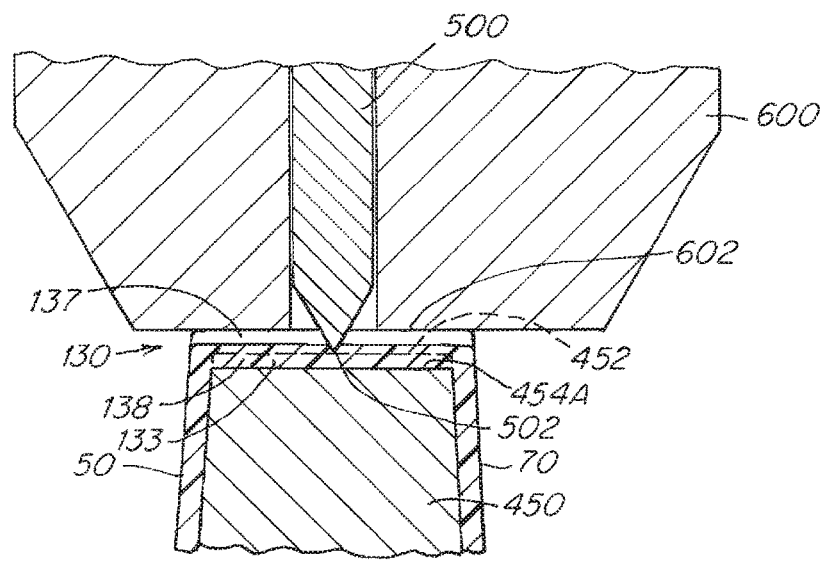
FIG. 12 is a schematic fragmentary enlarged detailed view of the knife and notched mold surface (first embodiment) of FIG. 11, in a transverse view, showing the un-notched knife cutting the hinge line of the carton.

FIGS. 11-12 show the membrane formation in greater detail. In FIG. 11, the knife 500 and striker 450 bar are shown, with the knife blade edge 502 in two positions with respect to the top surface of the striker bar. In the first position 502A, the knife edge engages the top surface of the hinge area of the carton and begins to cut into the hinge area 130. In the second position 502B the knife edge has fully cut through to the top surface 452 of the striker bar, thus severing the hinge line, and leaving only the uncut material in the notch 454 of the striker bar, which becomes the membrane 133 on the exterior surface of the hinge area 130. FIG. 12 is a transverse view showing the knife edge 502 in cross-section cutting through an upper portion 137 of the hinge area of the carton. The uncut lower portion 138 will become the connecting membrane disposed substantially on the exterior surface of the carton.

Figure 13:
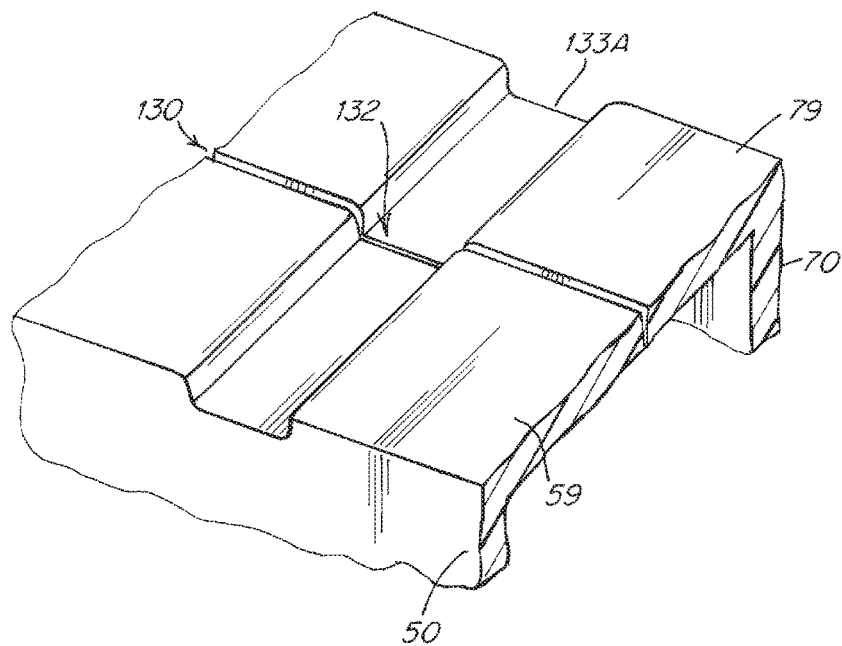
FIG. 13 is a schematic fragmentary enlarged view of a single notch in the hinge area in a full open position (first embodiment)
Figure 14:
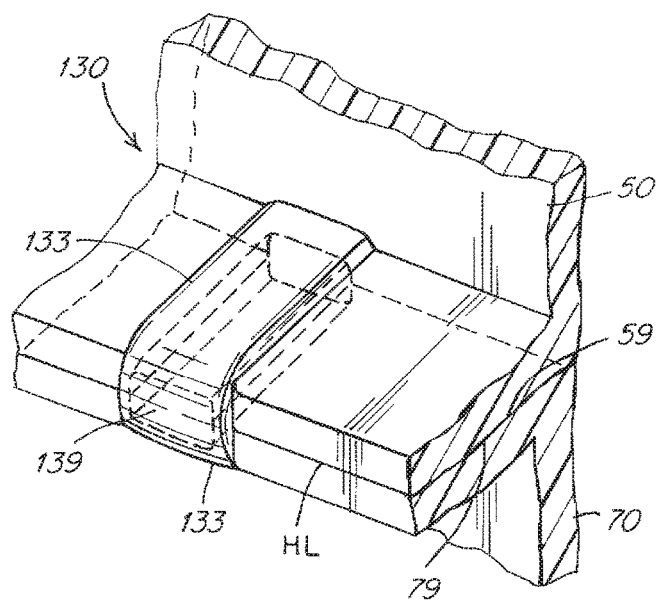
FIG. 14 is a view similar to FIG. 13 but showing the extending membrane on the bottom (exterior) of the hinge area in the fully closed (folded) position, showing in partial section the top (interior) surface of the membrane (first embodiment)

FIGS. 13-14 are enlarged views of a hinge portion of the hinge area 130 of the first embodiment, FIG. 13 showing the hinge portion from the interior side of the hinge area 130, in the fully open position. FIG. 14 shows the hinge portion fully closed, with the membrane 133 extending from the exterior (bottom) surface of the hinge area. A partial sectional view shows the interior (top) surface 139 of the membrane, which does not interfere with the folded hinge line.

Figure 9A:
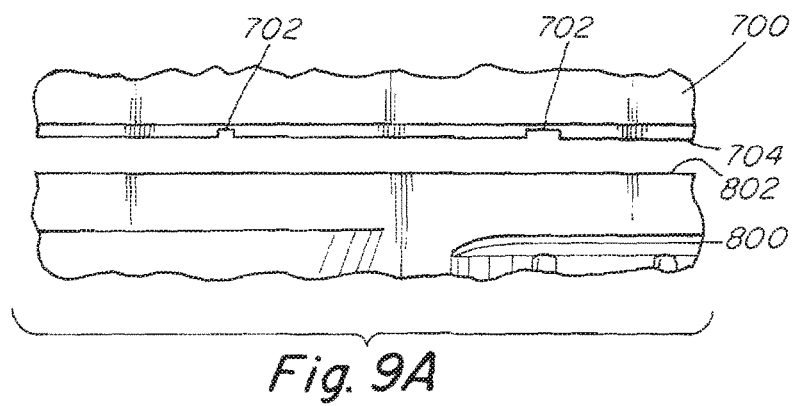
FIG. 9A is an enlarged fragmentary cross-sectional view similar to FIG. 9, but of an alternative embodiment in which the knife is notched and the hinge area of the mold is un-notched.
Figure 10A:
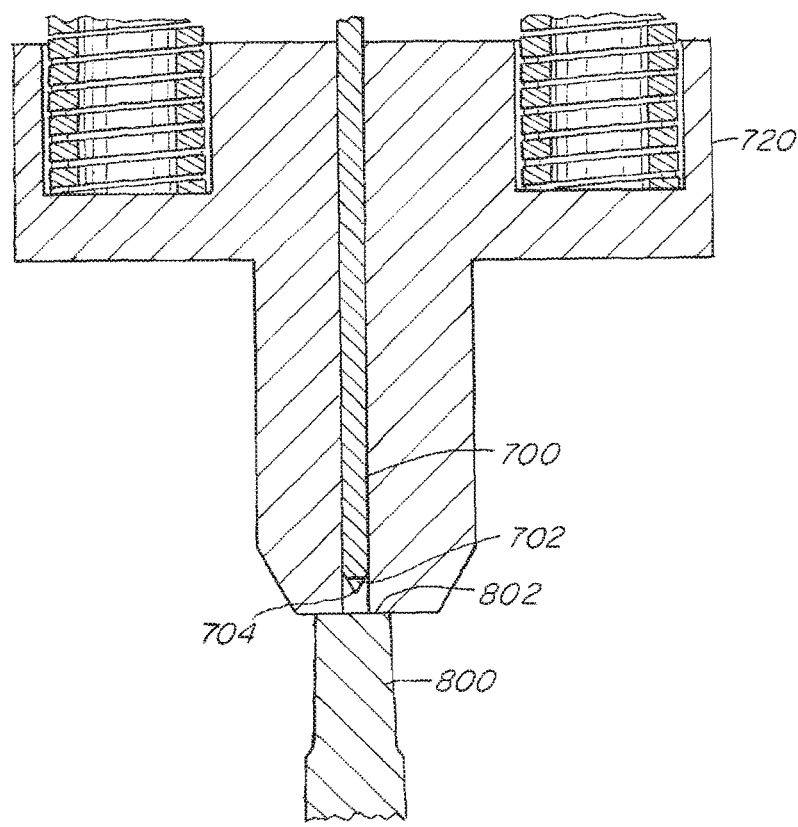
FIG. 10A is an enlarged fragmentary cross-sectional view of the notched knife and un-notched mold area (second embodiment) with a spring loaded clamp holding the hinge area in position during cutting of the hinge line.
Figure 11A:
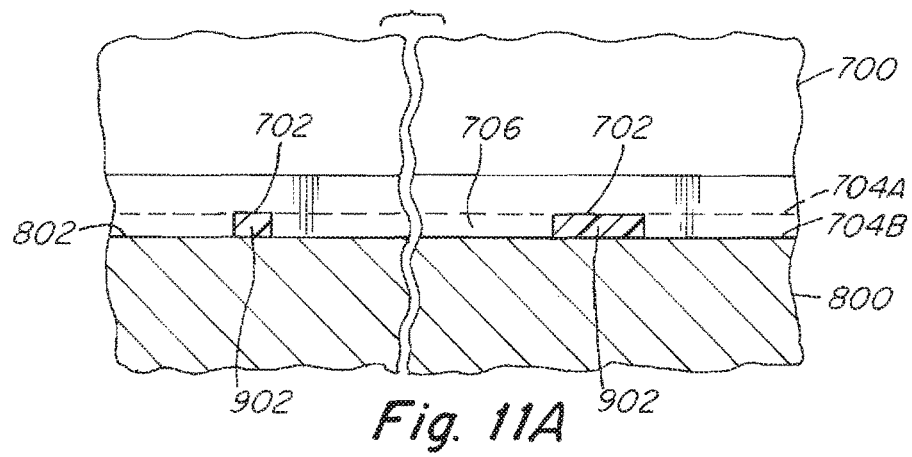
FIG. 11A is a schematic view similar to FIG. 11, but of the second embodiment showing the notched blade cutting the hinge line of the carton.
Figure 12A:
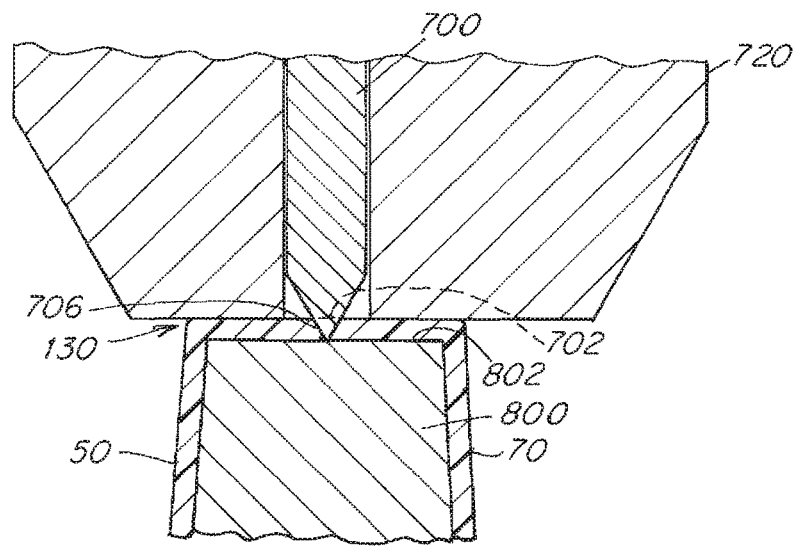
FIG. 12A is a schematic view similar to FIG. 12 but of the second embodiment showing the notched blade cutting the hinge line of the carton.

FIGS. 9A-10A, 11A-12A, and 13A-14A, are similar to FIGS. 9-10, 11-12, and 13-14, but illustrate a second embodiment in which the knife edge is notched, and the striker bar is un-notched. Thus FIG. 9A shows a fragmentary side view of a knife 700 and striker bar 800, the knife having a plurality of spaced notched portions 702 along the length of the cutting blade that will form un-severed portions 902 of the hinge area 900. FIG. 10a shows the clamping mechanism 720 engaging the upper molding surface 802 of the un-notched striker bar 800. FIG. 11A shows the notched blade 700 in two positions, an upper position 704A when it first engages the top surface of the carton, and a lower position 704B when it has cut through the carton along the hinge axis, except for the hinge area falling under the notches in the blade. FIG. 12A is a cross-sectional view through an un-notched portion 706 of the blade, showing the blade cutting through the hinge area and engaging the striker surface 802.

Figure 13A:
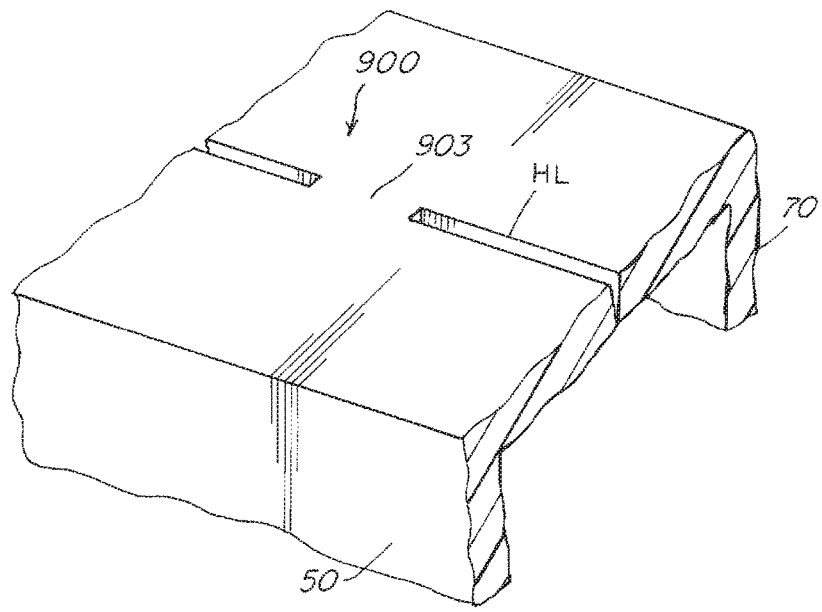
FIG. 13A is a view similar to FIG. 13 but of the second embodiment showing the top (interior) surface of the hinge portion prior to closing.
Figure 14A:
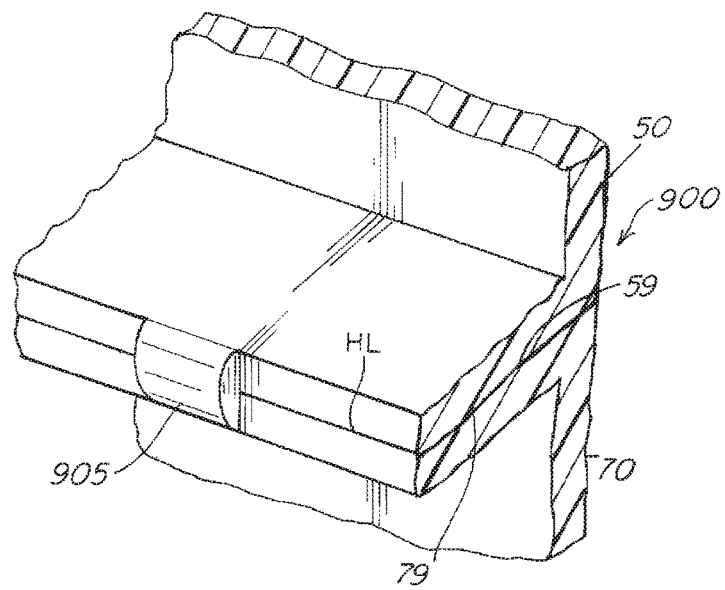
FIG. 14A is a view similar to FIG. 13A of the second embodiment showing the hinge fully closed.

FIG. 13A shows a pucker of material 903 left on the interior surface of the hinge area 900 by the notch 702 in the blade. FIG. 14A shows the bottom (exterior) surface of the closed hinge area, wherein the uncut material stretches out forming a reduced thickness web 905 extending across the bottom (exterior) of the hinge connection.

While specific embodiments of the present invention have been shown and described, it will be apparent that many modifications can be made thereto without departing from the scope of the invention. Accordingly, the invention is not limited by the foregoing description.

What is claimed is:

1. A method of thermoforming a hinged plastic container comprising:

thermoforming a hinged container from a sheet of thermoformable material in a mold, the mold including a top molding surface having:
- a first molding surface for forming a first portion of the container;
- a second molding surface for forming a second portion of the container; and
- a hinge molding surface between the first and second molding surfaces for forming a flat planar hinge connection area between the first and second portions of the container;

providing a knife positioned above the hinge molding surface, the knife having a cutting blade movable against the hinge molding surface;

clamping the flat planar hinge connection area against the hinge molding surface;

cutting a notched hinge line in the clamped hinge connection area of the thermoformed container in the mold, the notched hinge line including severed portions separated by connecting membranes joining the adjacent portions of the container, and wherein the hinge molding surface has a plurality notches, spaced apart along the hinge line, in which the connecting membrane portions are formed.

2. The method of claim 1, wherein the notches comprise grooves in the hinge molding surface disposed at an angle to the hinge axis, wherein the knife severs the areas between the grooves and the membranes in the grooves remain at least partially un-severed.

3. The method of claim 2, wherein the knife partially severs the material in the grooves.

4. The method of claim 1, wherein the clamping comprises holding the flat planar hinge connection area between a clamping surface of a clamp and the hinge molding surface.

5. The method of claim 4, wherein the clamping surface engages and holds the hinge connection area on two opposing sides of the hinge axis.

6. The method of claim 1, wherein the first molding surface is shaped to form a base portion of the container, and the second molding surface is shaped to form a lid portion of the container.

7. The method of claim 6, wherein the first molding surface comprises a matrix of cells.

8. The method of claim 7, wherein the mold further includes a third molding surface comprising a plurality of cells complimentary to the cells of the first molding surface for forming a cover cell portion of the carton, wherein the hinge molding surface is provided between the first and third molding surfaces.

9. The method of claim 1, wherein the container is a tri-fold egg carton, and the molding surfaces include first, second, and third molding surfaces for forming a lid, cell base, and cell cover portions of the carton respectively, with hinge molding surfaces provided between each of the first and second and between the second and third molding surfaces.

10. The method of claim 1, wherein the container is an egg carton, the first molding surface comprising a plurality of cells for forming a first cell portion of the egg carton, the second molding surface forming a lid portion of the carton.

11. The method of claim 10, wherein the second molding surface comprises a plurality of cells complimentary to the cells of the first molding surface for forming a second cell portion of the carton, the molding surfaces configured such that when the notched hinge connection is closed the first and second portions of the carton form complimentary cell pockets for holding individual eggs.

12. The method of claim 10, wherein the thermoforming step comprises thermoforming a unitary molded sheet of clear solid polyester or polystyrene foam.

13. A method of forming a tri-fold plastic thermoformed egg carton comprising:
- providing a unitary sheet of plastic material suitable for thermoforming;
- thermoforming the sheet to form a cell base, a cell cover and a lid, the thermoformed sheet including a hinge connection between adjoining edges of the cell base and the cell cover for pivoting of the cover and base between open and closed positions, the base and cover each having a complimentary matrix of cells that together form a matrix of cell pockets for holding individual eggs when the cover is in the closed position over the base, the lid and base having a hinge connection between opposing edges for pivoting between open and closed positions, wherein when the cover and base are in the closed position the lid can be closed over the cover to form an assembled carton;
- the hinge connection between the cell base and cell cover including a common planar wall portion having an upper planar surface lying in a common plane CP, a plurality of thermoformed connecting membranes recessed from the CP and spaced apart along a hinge axis of the hinge connection;
- forming a severed hinge line severing the common planar wall portion without severing the connecting membranes, such that the connecting membranes form a hinged connection between the severed portions of the common planar wall portions, and wherein the hinge connection is formed by thermoforming the sheet against a notched striker bar, the notched striker bar having a planar wall with a plurality of spaced apart grooves, wherein the connecting membranes are formed by deforming the sheet into the grooves of the notched striker bar to form the connecting membranes, and a continuous cutting blade engages the un-notched portions of the sheet formed against the planar wall of the striker bar to form the severed hinge line.

14. The method of claim 13, wherein the notches comprise grooves in the hinge molding surface disposed at an angle to the hinge axis, and wherein the knife severs the areas between the grooves and the membranes in the grooves remain at least partially un-severed.

15. The method of claim 14, wherein the knife partially severs the material in the grooves.

16. The method of claim 13, wherein the unitary sheet of plastic material is clear solid polyester or polystyrene foam.

* * * * *